United States Patent [19]
Fontana

[11] 3,871,698
[45] Mar. 18, 1975

[54] HOOKING SUSPENSION SYSTEM
[76] Inventor: Ludovico Fontana, Via Principe Amedeo 31, Bari, Italy
[22] Filed: Dec. 26, 1972
[21] Appl. No.: 318,485

[30] Foreign Application Priority Data
Jan. 28, 1972 Italy.................................. 2106/72

[52] U.S. Cl.................. 294/83 R, 294/74, 339/135
[51] Int. Cl............................ B66c 1/36, H02b 1/02
[58] Field of Search ...... 294/83 R, 75, 74, 84, 65.5; 254/196; 339/135

[56] References Cited
UNITED STATES PATENTS
| | | | |
|---|---|---|---|
| 2,196,460 | 4/1940 | Hertel.............................. | 294/82 R |
| 2,835,528 | 5/1958 | McCarthy et al..................... | 294/74 |
| 3,630,562 | 12/1971 | Metz................................ | 294/83 R |
| 3,638,170 | 1/1972 | Clement et al. .................... | 339/135 |
| 3,647,170 | 3/1972 | Beeker et al...................... | 294/74 X |

Primary Examiner—James B. Marbert
Assistant Examiner—Bruce H. Stoner, Jr.
Attorney, Agent, or Firm—McGlew and Tuttle

[57] ABSTRACT

Hooking suspension system comprising a hook, a grip for the load engaged by said hook and some electric circuits for the transmission of electric power to the load through the suspension hook, said hook being made in two portions, one of the stationary and the other movable with regard to the former portion and which may be driven by means of an electromagnet, such as to allow the fast release of the load from the hook, only when the load is resting on the ground.

3 Claims, 4 Drawing Figures

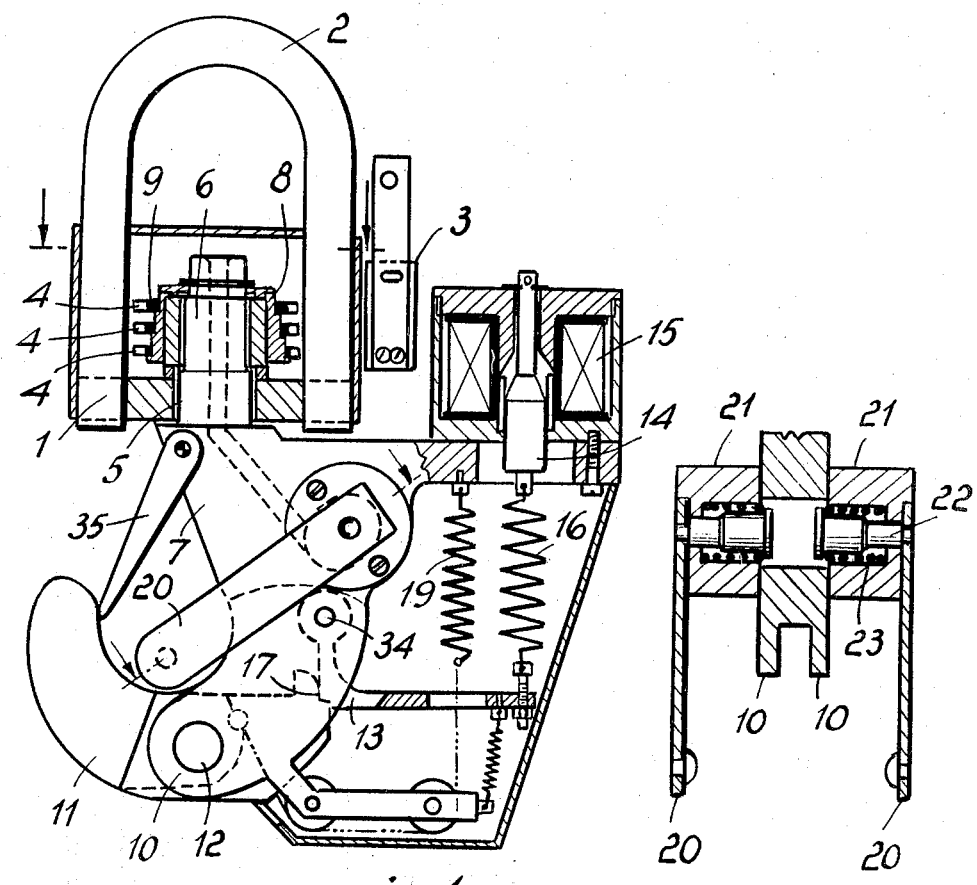
Fig.1
Fig.2
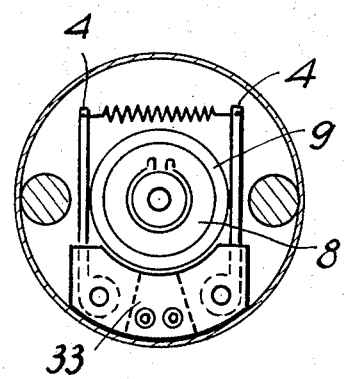
Fig.3

HOOKING SUSPENSION SYSTEM

BACKGROUND AND SUMMARY OF THE INVENTION

In so many applications there is the need of having a fast hooking and an automatic release suspension system which besides the lifting of the container or the load allows the possibility too of feeding electric power to the container load itself through two or more circuits.

The system, object matter of the present invention, solves all of the problems mentioned above and by way of example an embodiment of same is illustrated in the accompanying drawings where:

FIG. 1 shows the suspension hook in vertical section.

FIG. 2 is a cross sectional view illustrating the side contacts of the suspension hook.

FIG. 3 is a plan view illustrating the rotary contacts of the suspension hook.

Figure 4:
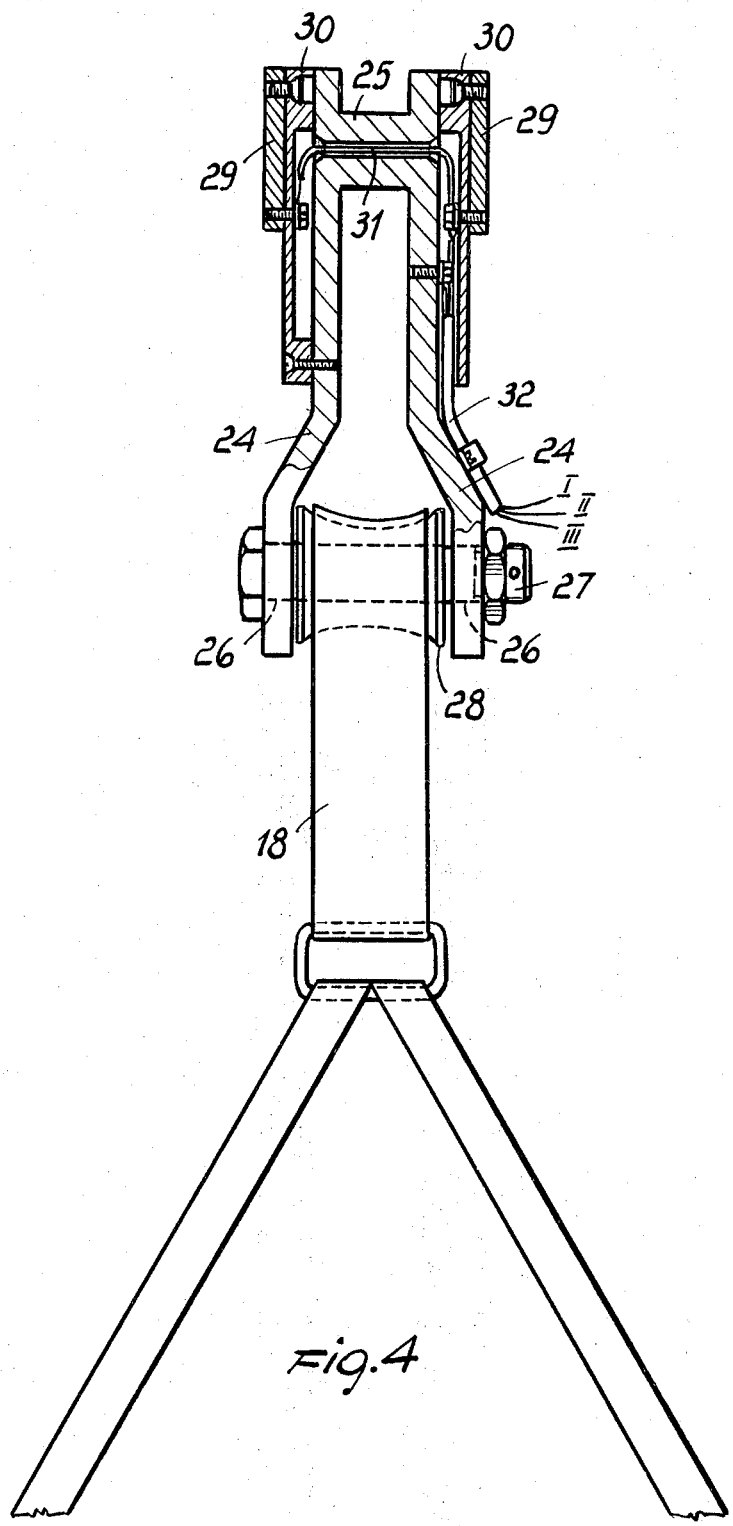
FIG. 4 is a vertical section which shows the hooking grip and the relevant hoisting sling.

The system allows the following operations:

a. hoisting of the container bearing the load;

b. automatic release of the container bringing the load from the suspension hook when the transport has been carried out and the load or the container is placed onto the ground;

c. automatically shifting back the suspension hook so as to receive a new hooking grip;

d. transmission of electric power through three lines from the transport means to which the suspension hook is fixed to the container which bears the load;

e. indeterminate rotation of the container, engaged by the suspension hook, around a vertical axis.

DESCRIPTION OF SPECIFIC EMBODIMENTS

The figures show clearly the functioning principle of the system.

The rotary suspension hook (FIG. 1) comprises a base 1, on which there are fastened the suspension means or ring 2, the four pole connector or electrical connecting means 3 and the conductive brushes 4 or means for conducting current from the base to the hook.

The brushes mentioned above are mutually spaced apart and separated relative to the base 1 by means of an insulating support 33. In the aperture or hole 5 of the base 1 there is located the pin 6 formed within the top portion of the rigid part 7 of the hook. On said pin 6 there is threaded an insulating bush 8 on which there are secured three conductive rings 9 reciprocally spaced apart and insulated with respect to the pin 6. The rigid part 7 is terminated by a fork 10 into which the movable portion 11 of the hook is inserted.

The pin 12 allows the movable portion 11 to turn about it only when the pawl 13 is called back by the armature 14 of the electro-magnet 15 by means of the spring 16 thus, the pawl 13 turns around the axis 34 and leaves the blocking point 17 situated in the back portion of the movable part of the hook 11.

The rigid part of the hook 7 is equipped or fitted with movable contact means, namely two side contacts 20. Each of these side contacts 20 is kept in situ through a suitable stud 22 which is located in a fit insulating support 21. The convenient spring 23 permits a sufficient springiness to the contacts 20.

The loading or hooking grip (FIG. 4) is made of a V-shaped supporting member having two side cheeks 24 which at the top are rigidly fastened mutually by means of a distance piece 25 whereas at the bottom they are secured through bearing means comprising a stud 27 threaded into the holes 26 formed within the cheeks themselves. On said stud there is mounted the shaped bush 28 which operates as a guide for the hoisting means or sling 18. On each of said cheeks 24 there are placed the contacts 29 which are insulated with respect to the mass of the grips by means of insulating supports 30. A suitable drilling 31 allows the passage through the distance piece 25 of the conductor which connects the left hand contact to the three-pole cable 32 which conveys the power to the container holding the load secured to the hoisting sling 18.

The transmission of the electric power through the suspension hook takes place as follows: from the connector 3 of four poles current is fed to the mass of the hook itself and the three brush shaped contacts 4.

From the brush contacts 4 the power is transmitted to the three rings 9; from these rings a conductor runs which feeds the coil of the electromagnet 15 while the other two feed the side contacts 20 respectively. From these contacts the power is conveyed to the contacts 29 of the hooking grip and to the mass of the grip itself. A suitable bracket 35 prevents the hooking grip from casually leaving the hook 11.

By hooking the hooking grip (FIG. 4) to the suspension hook (FIG. 1) the grip is strongly held by the hook itself. In this position the side electric contacts 20 of the suspension hook are engaging the corresponding side contacts 29 of the hooking grip, whereas the mass itself of suspension hook is contacting the mass of the hooking grip producing in this manner a three-pole contact system.

Therefore the system may be in the following positions:

I. Suspension hook free, that is to say, the hooking grip is not engaging the hook itself. In such a position by acting on the electromagnet 15 the spring 16 causes the pawl 13 to rotate so that the movable portion 11 is released. This movable portion, however, does not carry out a rotation in that it is held in place through the spring 19. Therefore, when the energization of the electromagnet 15 is stopped the spring 16 too does not urge the pawl 13 and the suspension hook finds itself in the start position, that is to say, ready to receive steadily the hooking grip.

II. Suspension hook with grip hooked. In this position there can take place two distinct events:

a. The container leaves the ground. In such an occasion a force of noteworthy value comes to urge the movable portion 11 of the suspension hook. The spring 16 put under tension by means of the armature 14, when the electromagnet 15 is energized, is not enough to overcome or withstand the force exerted by the movable portion 11 on the pawl 13 and therefore the movable portion itself cannot turn around the pin 12. In other words the suspension hook cannot open and leave the grip when said container is suspended above the ground.

b. The container is resting on the ground. In such a state the only weight bearing on the grip and on the sling is urging the movable portion 11 of the suspension hook. The spring 16, put under tension because of the attraction brought about by the armature 14 of the energized electromagnet 15 is sufficient to overcome the opposition exerted by the movable portion 11 on the pawl 13 and therefore the movable portion of the hook itself turns about the pin 12 opening the suspension hook. Said in other words, the suspension hook leaves the hooking grip. As soon as it has left the hooking grip the suspension hook comes back to the position mentioned at point I, to wit, it is brought again to the start position, so that the hook is ready to receive a new hooking grip.

What I claim is:

1. Hooking suspension system which comprises
a. a hook for suspending a load comprising an upper portion and a lower portion forming a curved trough for bearing the load, the upper portion being fixed and the lower portion being movable downwardly so as to release the load when moved downwardly, a base having an aperture through which is rotatably mounted the upper portion of the hook, ring contact means mounted on said base, suspension means connected to said base, electrical current connecting means fastened to said base, and brush shaped contact means for conducting the electrical current from the base to said ring contact means; an electromagnet having a movable armature connected to said means for connecting electrical current; means for moving said lower portion of the hook downwardly, said means being operably connected to the armature of the electromagnet; and movable contact means pivotally connected to the upper portion of said hook and adapted to contact the load when bearing on the hook; and
b. a hooking grip for supporting the load comprising a U-shaped supporting member having an upper portion adapted to engage said suspension hook, and a lower portion comprising two arms, electrical contact means placed on each side of the upper portion of said supporting member of the hooking grip and insulated therefrom, a three-pole cable connected to the U-shaped supporting member, and to each of said contact means, bearing means secured to the lower portion of the U-shaped supporting member hoisting means engaging said bearing means and adapted to support the load, said electrical contact means on each side of the supporting member of said hooking grip being adapted to contact the movable contact means pivotally connected to the upper portion of said hook.

2. Hooking suspension system for suspending a load which comprises a hooking grip and a hook, said hook comprising a first portion forming one part of an enclosing hook loop, a second portion pivotal with respect to the first portion and forming the remaining part of the enclosing hook loop for engaging the load, an electromagnet connected to said first portion and operably connected to the second portion for opening the hook loop and disengaging the hook from the load, said first portion and said second portion forming a curved trough for bearing the load, the first portion being fixed and the second portion being movable downwardly so as to release the load when moved downwardly; a base having an aperture through which is rotatably mounted the first portion of the hook, said base having suspension means connected to said base, electrical current connecting means fastened to said base, means for conducting the electrical current from the base to the upper portion of the hook, said upper portion of the hook being fitted with movable contact means for engaging a load through said hooking grip when bearing on said hook; said electromagnet having a movable armature connected to said means for conducting electric current.

3. Hooking suspension system according to claim 2, wherein said hooking grip for supporting a load comprises a U-shaped supporting member having an upper portion adapted to engage said suspension hook, and a lower portion comprising two arms, electrical contact means placed on each side of the upper portion of said supporting member and insulated therefrom; a three-pole cable connected to the U-shaped supporting member and to each of said contact means, bearing means secured to the lower portion of the U-shaped supporting member, hoisting means engaging said bearing means and adapted to support the load.

* * * * *